June 9, 1925.  
W. T. HASTING  
MEANS FOR PREVENTING CORROSION OF BATTERY POSTS AND TERMINALS CONNECTED THERETO  
Filed April 27, 1923
1,541,495
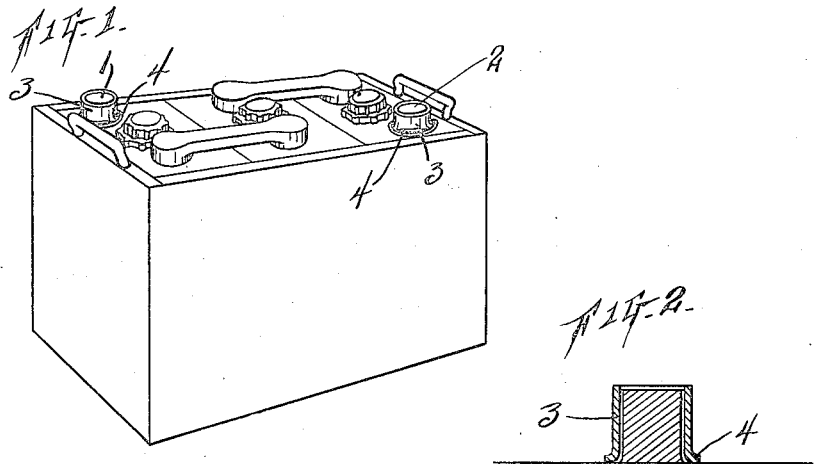
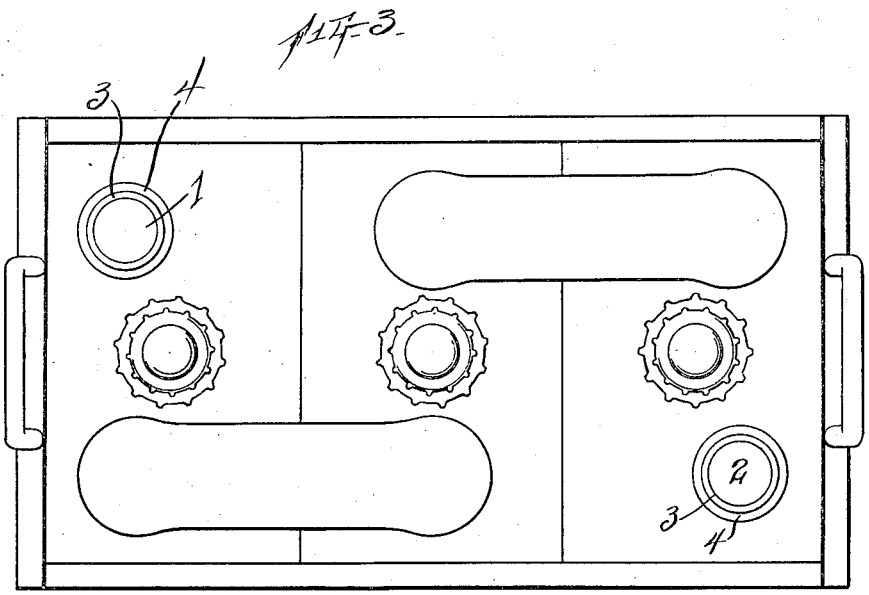
Inventor  
WILLIAM T. HASTING  
By A. L. Jackson  
Attorney Patented June 9, 1925.

1,541,495

UNITED STATES PATENT OFFICE.

WILLIAM T. HASTING, OF FORT WORTH, TEXAS.

MEANS FOR PREVENTING CORROSION OF BATTERY POSTS AND TERMINALS CONNECTED THERETO.

Application filed April 27, 1923. Serial No. 635,173.

*To all whom it may concern:*

Be it known that I, WILLIAM T. HASTING, a citizen of the United States, residing at Fort Worth, in the county of Tarrant and State of Texas, have invented certain new and useful Improvements in Means for Preventing Corrosion of Battery Posts and Terminals Connected Thereto, of which the following is a specification.

My invention relates to means for preventing the corrosion of battery posts and terminals connected thereto and particularly to means making a more perfect connection of the terminals with the post; and the object is to provide a simple means for protecting terminals and posts of batteries for use with motor vehicles and also of batteries of various other motors and to provide a device which is simple in construction and which can be easily and quickly installed and which can be furnished at small cost and which is highly efficient in preventing corrosion. Other objects and advantages will be fully explained in the following description and the invention will be more particularly pointed out in the claims.

Reference is had to the accompanying drawings which form a part of this application.

Fig. 1 is a perspective view of a battery box. Fig. 2 is a vertical section of a metallic ferrule which is used in carrying out this invention. Fig. 3 is a plan view of a battery, showing the application of the improved ferrule.

Similar characters of reference are used to indicate the same parts throughout the several views.

The drawings show posts 1 and 2 of a battery of ordinary type. A ferrule 3 of brass or copper or other suitable metal is provided for each post. Each ferrule is preferably provided with a flange 4 for making firmer connection and keeps the terminals from coming in contact with the top of the box. If the posts 1 and 2 are too large to receive the ferrules, they can be reduced in size until the ferrules can easily be placed thereon. The posts and the terminals should be thoroughly cleaned. The ferrules can be applied to new or old posts. After cleaning the posts and terminals, put on a flux paste. The ferrules are placed on the posts and then heated until the lead of the posts adhere to the ferrules and a complete bond is formed between the ferrule and the post.

What I claim is,—

1. The combination with the posts of a battery and the terminal clamps, ferrules placed on the posts and bonded with the metal of the posts, and flanges on the lower edges of the ferrules to support the terminal clamps above and out of contact with the top of the battery box.

2. The combination with the posts of a battery and the terminal clamps, ferrules of brass mounted on the posts and bonded therewith and forming firm connections between the posts and the clamps and flanges on said ferrules to prevent the terminals from coming in contact with the top of the box.

In testimony whereof, I set my hand, this 3rd day of March, 1923.

WILLIAM T. HASTING.